United States Patent
Fabrizio

(10) Patent No.: US 7,712,730 B2
(45) Date of Patent: May 11, 2010

(54) SHOCK DAMPENER BUMPER FOR MOTOR-VEHICLES

(75) Inventor: Furlan Fabrizio, Ponte della Priula (IT)

(73) Assignee: Lightech S.r.L., Santa Lucia di Piave (IT)

( * ) Notice: Subject to any disclaimer, the term of this patent is extended or adjusted under 35 U.S.C. 154(b) by 0 days.

(21) Appl. No.: 12/290,817

(22) Filed: Nov. 4, 2008

(65) Prior Publication Data

US 2009/0134642 A1 May 28, 2009

(30) Foreign Application Priority Data

Nov. 6, 2007 (IT) .......................... PN20070036 U

(51) Int. Cl.
*F16F 15/08* (2006.01)
(52) U.S. Cl. .................... 267/152; 296/190.07; 267/153
(58) Field of Classification Search .................. 267/140, 267/141.1–141.7, 152, 153, 293, 294; 403/221–228; 248/635; 296/35.1, 190.07
See application file for complete search history.

(56) References Cited

U.S. PATENT DOCUMENTS 7,416,244 B2 * 8/2008 Polk et al. .............. 296/190.07

2006/0163785 A1 * 7/2006 Goudie ..................... 267/141.5
2008/0303196 A1 * 12/2008 Lyew et al. .................... 267/33

* cited by examiner

*Primary Examiner*—Christopher P Schwartz
(74) *Attorney, Agent, or Firm*—Bucknam & Archer

(57) ABSTRACT

Shock dampener bumper for motor-vehicles, adapted to be applied on to motor-vehicles of various kind, both for personal uses and for sports contests, for protecting the constructive structure of each motor-vehicle from any possible damage and/or breakage thereof, in the case in which the motor-vehicle falls. Bumper composed of first and second component parts combined and assembled to each other with adequate arrangements, of which said first component parts (disc 8, bush 10 and cap 11) are made of semi-rigid materials such as magnesium, plastic, Teflon, aluminium and other metallic and/or plastic materials having similar characteristics, which are able to be fixed to and supported by the motor-vehicle constructive structure and to come into contact with the ground during the fall of the motor-vehicle, and said second component parts (disc 9) are made of elastic material, preferably elastomers such as for example rubber, said second component parts (9) being interposed between said first component parts (8, 10, 11), for damping and absorbing the energy of shocks and related vibrations, which are produced during the fall and which are transmitted to the motor-vehicle constructive structure.

3 Claims, 5 Drawing Sheets

SHOCK DAMPENER BUMPER FOR MOTOR-VEHICLES

BACKGROUND OF THE INVENTION

The invention relates to a shock dampener bumper for motor-vehicles, adapted to be applied on to motor-vehicles of various kind, both for personal uses and for sports contests and made in a simple, practical and versatile manner, in order to prevent damages to the motor-vehicle constructive structure in cases in which they fall, by dampening effectively the shocks deriving from the contact with the ground. Shock dampener bumpers built in on the motor-vehicles of the kind referred to are known, for dampening shocks deriving when such motor-vehicles fall on to the ground, in a way to avoid or limit as much as possible the damages to the constructive structure of the same motor-vehicles. These bumpers are generally constituted by a single adequately shaped part of aluminium or plastic material, which is secured at its one end portion laterally on a suitable position to the motor-vehicle constructive structure, by utilizing suitable thickening elements and screws, and the other free end portion of which is slightly projected from the profile of the relative motor-vehicle constructive structure and, during the fall, comes into contact with the ground by damping such shocks, thereby preventing that such constructive structure comes into contact with the ground, by damaging or breaking it. These kinds of bumpers provide for effective damping actions which depend on the their size and the composition of their material, in that during the impact with the ground they transmit unavoidably some vibrations to the constructive structure of the relative motor-vehicle too, and these vibrations are absorbed effectively by the material of the same bumpers, and therefore do not produce damages to such structure, until the bumpers have pre-established sizes. On the contrary, in the case in which such bumpers have sizes greater than such pre-established values, the vibrations produced when the motor-vehicle falls exceed the safety values and may also be amplified, and under such circumstances when impacting the ground the bumper behaves like a component integral with the motor-vehicle constructive structure, in such a manner to safeguard only the more external parts of the constructive structure, by discharging through the bumper securing support all the energy deriving by the impact of both such support and the remaining component parts of the structure (engine, etc.), thereby producing the breaking and damaging of all these parts.

BRIEF SUMMARY OF THE INVENTION

The object of the present invention is to provide for a shock dampener bumper for motor-vehicles, adapted to avoid with safety that all these drawbacks may occur when the same motor-vehicles fall, independently from the bumper size, and therefore by damping effectively all the impact energy without damaging or breaking the different component parts of the motor-vehicle, this bumper being realized in a simple, practical and versatile manner, in that it is adaptable to motor-vehicles of various types, shapes and sizes.

BRIEF DESCRIPTION OF THE DRAWINGS

This shock dampener bumper is made with the constructive characteristics substantially described, with particular reference to the attached drawings, wherein.

DETAILED DESCRIPTION OF THE INVENTION

Figure 1:
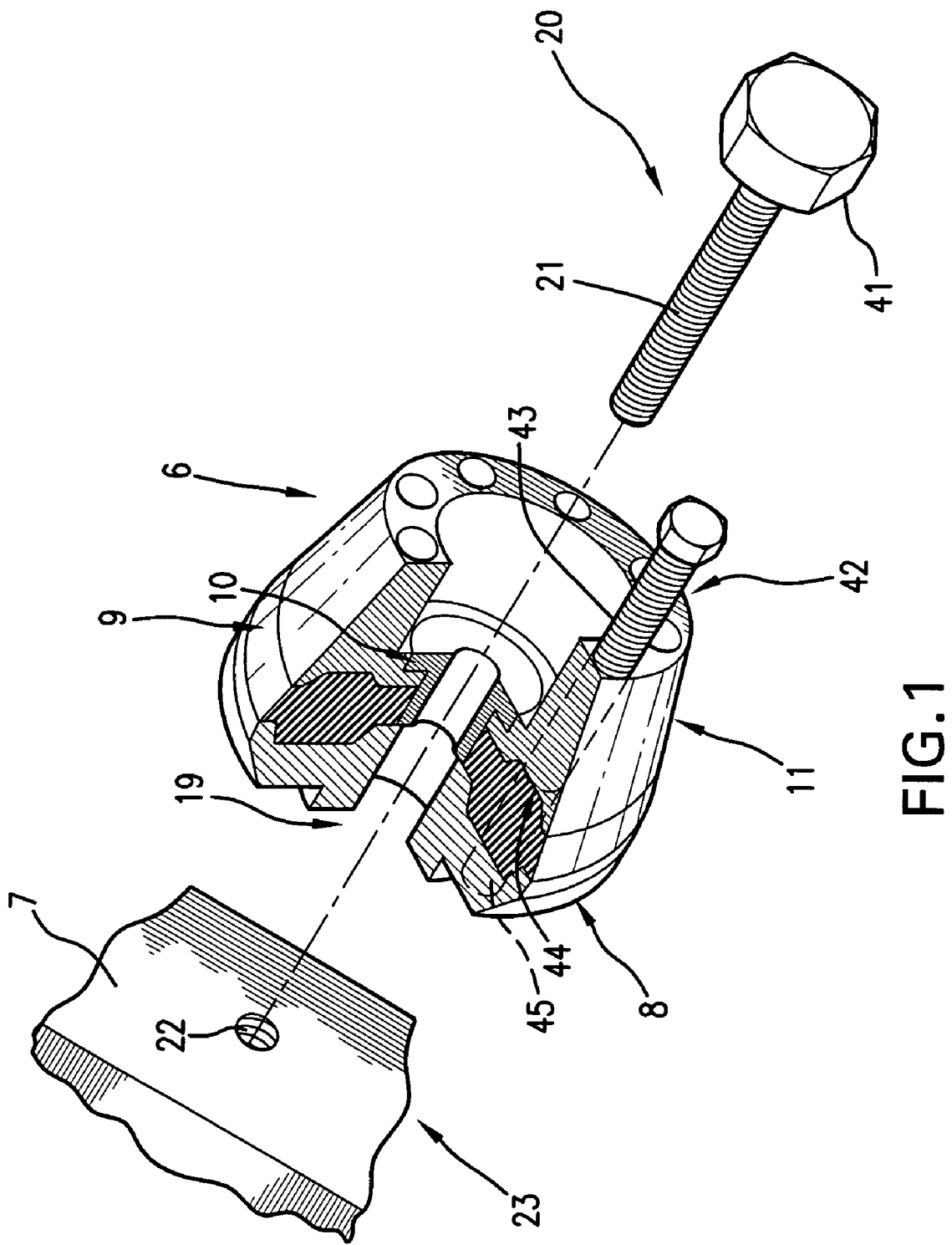
FIG. 1 shows a partially cutaway front view of a shock dampener bumper according to the invention, built in on a motor-vehicle and with all its component parts assembled to each other.

FIG. 1 illustrates a shock dampener bumper 6 according to the invention, built in on a motor-vehicle of various kind, both for personal uses and for sports contests, of which only a portion 7 thereof is shown, which bumper is made with such characteristics as to dampen and absorb effectively the shocks deriving in the case in which the motor-vehicle falls on to the ground, so as to prevent with safety some damages and/or breakages of the constructive structure of the same motor-vehicle. The shock dampener bumper is substantially constituted by different component parts combined and assembled to each other with suitable arrangements, which are made with the different materials which will be described, and in particular it is constituted by a set of four component parts adaptable to each other and formed by a shaped circular disc 8, turned toward the motor-vehicle constructive structure and supported by the same as it will be described, by a further shaped circular disc 9 adaptable over the preceding disc 8, by a support bush 10 inserted through the circular disc 9 and adaptable with both the same and the shaped disc 8, and by a covering cap 11 adaptable over the intermediate disc 9 and the bush 10 and turned outwards, and adapted to come into contact with the ground when the motor-vehicle falls.

Figure 2:
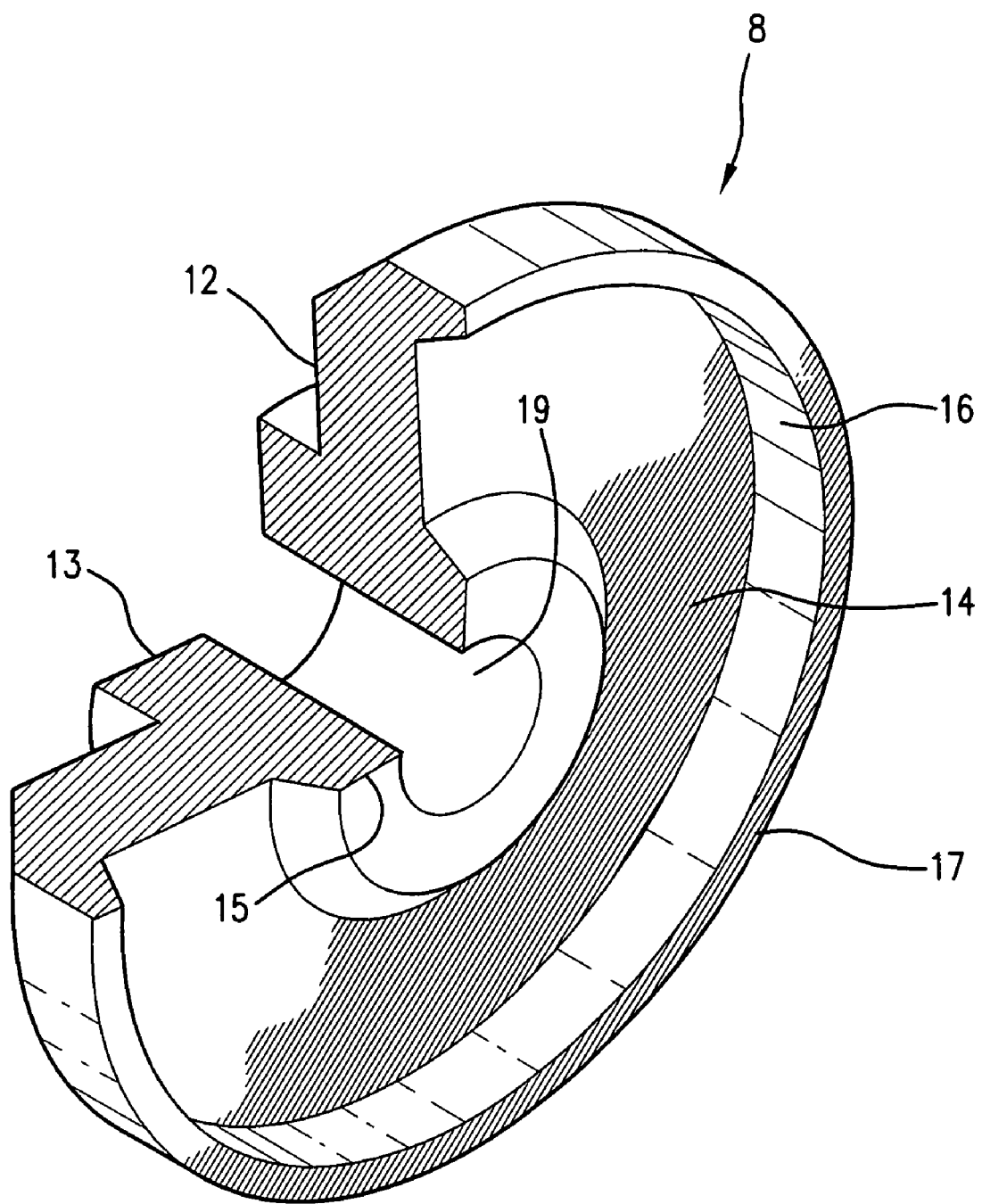
FIGS. 2, 3, 4 and 5 show some partially cutaway perspective front views of the four single component parts constituting the bumper of FIG. 1.

The so constituted bumper has a frusto-conical shaped outline, the larger base of which is turned towards the motor-vehicle and the smaller base of which is arranged in an opposite direction, turned outwards. As visible from the FIG. 2, the circular disc 8 is substantially made of a semi-rigid material such as magnesium, plastic, Teflon, aluminium and other metallic and/or plastic materials having similar characteristics, and is shaped with a reduced thickness and a flat back surface 12 turned towards the motor-vehicle, which is joined with a short central hub 13 also turned towards the motor-vehicle and protruded towards this latter beyond the back surface 12, and moreover shaped with a flat front surface 14 turned in an opposite direction, which is joined at one end portion thereof with a conical shaped central collar 15, slightly projected outwards, and at the other end portion thereof with an inclined and raised edge 16, directed outwards and terminating with a flat circular shaped inclined peripheral edge 17. Furthermore, the circular disc 8 is provided with an axial and central through hole 19, provided through the hub 13 and the collar 15, so as to allow a fixing stud 20 (see FIG. 1) to be inserted and fixed therethrough, which is able to support the shock dampener bumper and to be supported by the motor-vehicle constructive structure.

Figure 3:
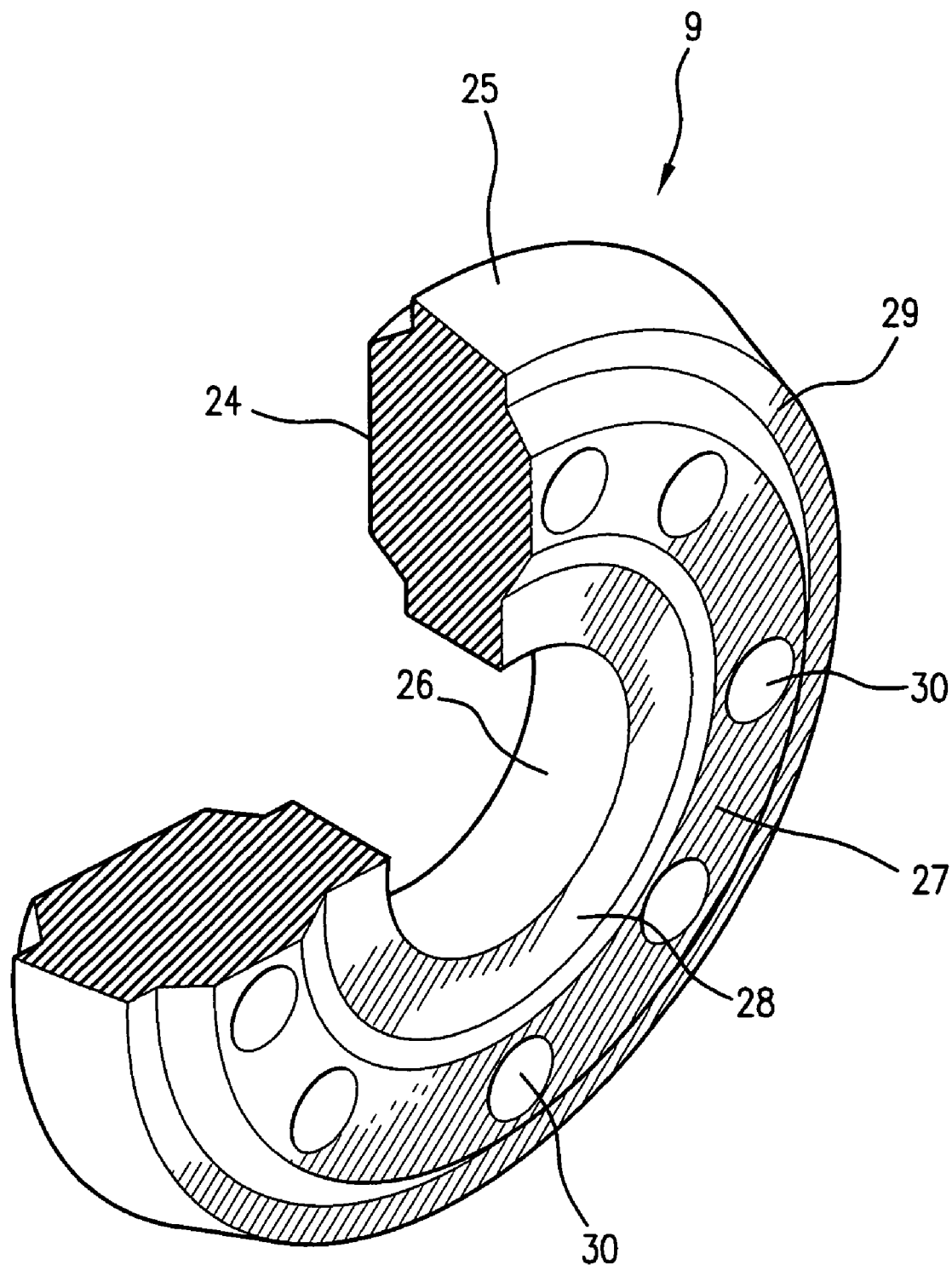

To this aim, the stud 20 is provided with a threaded shank 21, which can be screwed in a corresponding threaded hole 22 provided in a part 23 of the motor-vehicle constructive structure or in the engine of the vehicle. In turn, as visible from the FIG. 3, the further circular disc 9 is substantially made of an elastomeric material such for example the rubber, acting as shock damping and absorbing material, and is shaped with a reduced thickness and a projected rear surface 24, with an outline identical and slightly smaller than that of the housing seat of the preceding disc 8, which is defined by the flat front surface 14, the central collar 15 and the inclined and raised edge 16, so as to be adapted by insertion into such housing seat. Moreover, such projected rear surface 24 is joined with its external end portion to a flat inclined and circular shaped peripheral edge 25, and with its inner end portion to an axial and central through hole 26 of the disc 9, provided in a position coinciding with that of the central through hole 19 of the previous disc 8.

Figure 4:
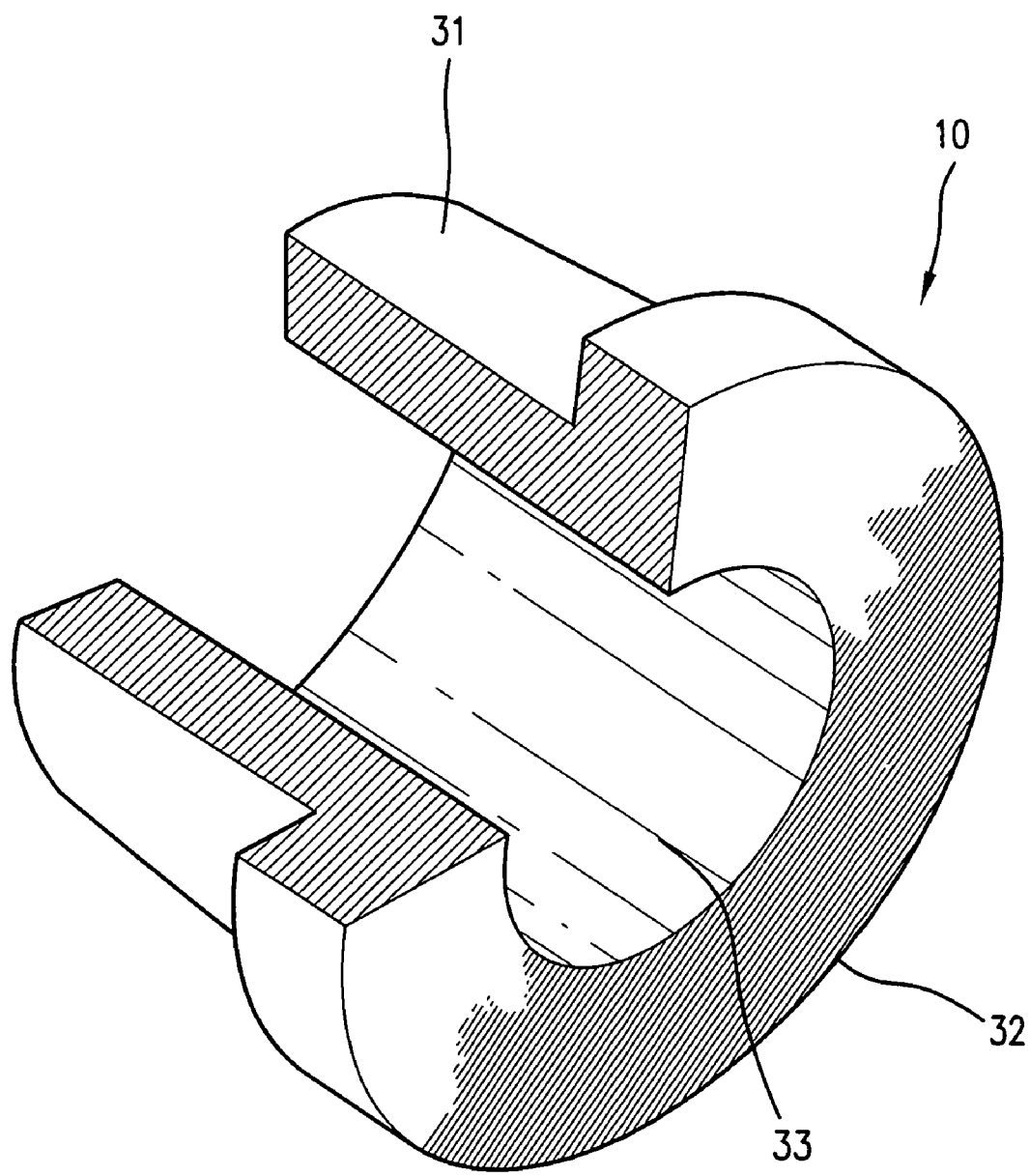
Figure 5:
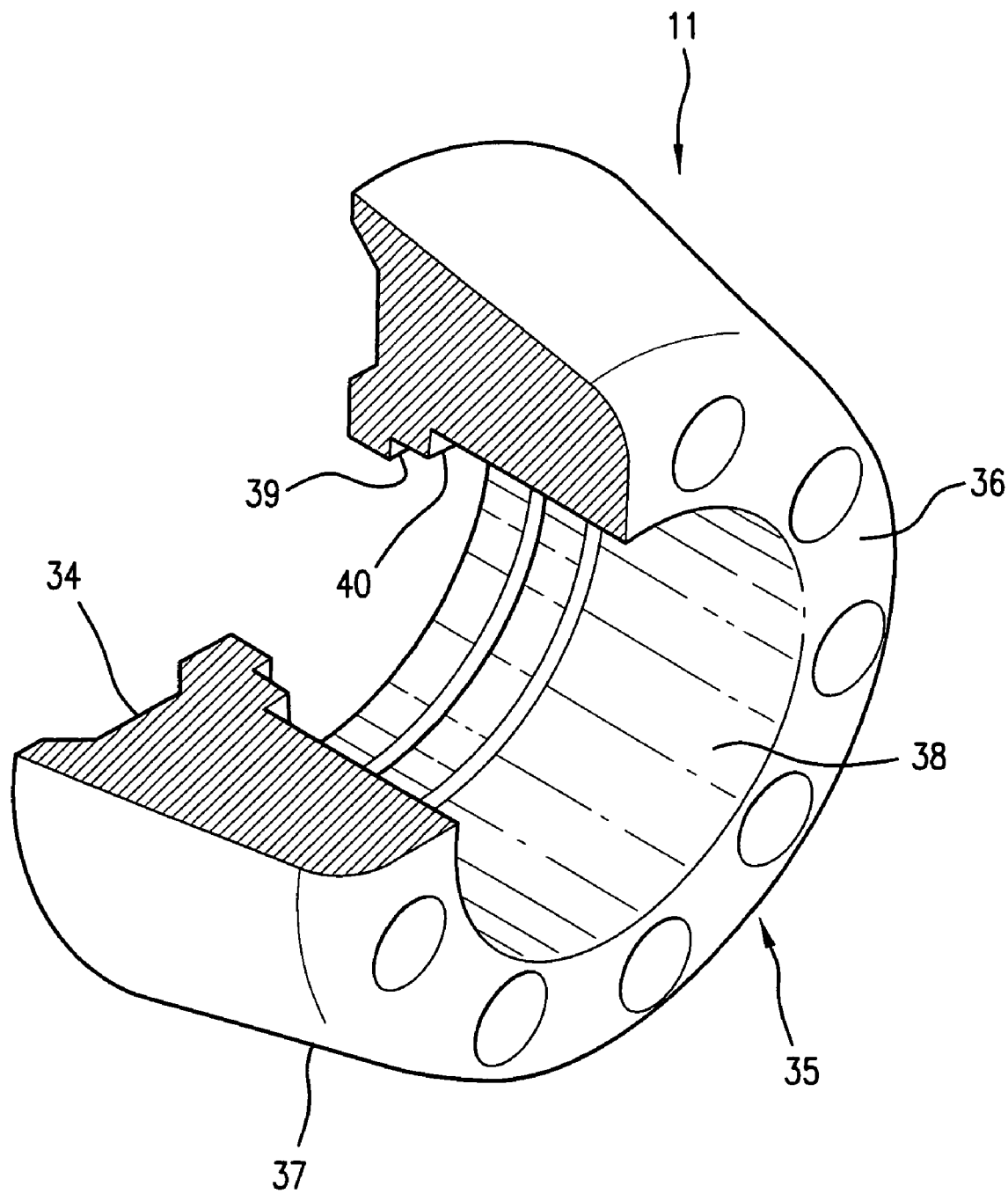

In addition, such disc 9 is shaped with a flat front surface 27 turned in an opposite direction and directed outwards, which is joined at its one end portion with a flat and cylindrical central collar 28, which is depressed with respect to the front surface 27, and delimits the central through hole 26 of the disc 9, and at the other end portion thereof is joined with a flat edge 29, which is depressed with respect to the front surface 27 and terminates with the flat and inclined circular shaped peripheral edge 25. Advantageously, several cavities 30 adequately spaced away from each other in a circular direction are provided in the flat front surface 27, which are adapted to improve the elastic deformation of the disc 9 during the contact of the bumper with the ground, which is determined by the motor-vehicle fall, as well as to reduce the consumption of the elastomeric material utilized for manufacturing the same disc. FIG. 4 shows now the support bush 10, which is constituted by the same semi-rigid material of the disc 8, and is shaped with a cylindrical rear shank 31 and a cylindrical front head 32, joined to such shank 31 and made with a diameter larger than that of this latter and a limited thickness, said shank and head being crossed by a central through hole 33 provided in a position coinciding with that of the central through holes 19 and 26 of the respective discs 8 and 9. The cylindrical shank 31 is realized with a diameter slightly smaller than that of the central through hole 26 of the disc 9 and identical to that of the projected central collar 15 of the disc 8, respectively for being able to be inserted through such through hole and for being abutted on the same collar as it will be described, while the head 32 of the bush 10 is able to be supported as it will be described by the covering cap 11. As visible from the FIG. 5, the covering cap 11 is constituted by the same semi-rigid material of the disc 8 and the bush 10 and is shaped with a flat and hollowed back surface 34, having an outline identical and slightly smaller than that of the housing seat defined by the front surface 27, the depressed flat collar 28 and the depressed flat edge 29 of the intermediate disc 9, so as to be able to be adapted by insertion into such housing seat. Besides, the front surface 35 turned outwards the cap 11 is shaped with a flat edge 36, joined to the frusto-conical peripheral surface 37 of the same cap and the entire cap is crossed by an axial and central through hole 38, provided in a position coinciding with those of the through holes 19, 26 and 33 respectively of the discs 8 and 9 and the bush 10, and the front mouthpiece of such through hole 38 is realized with a diameter larger than that of said through holes 19, 26 and 33, while the opposite back mouthpiece of the through hole 38 is realized with a diameter smaller than that of said front mouthpiece, and slightly larger than the outer diameter of the shank 31 of the bush 10. Moreover, the two portions of the through hole 38 having different diameters are joined to each other with two flat circular steps 39 and 40, shaped with different diameters and a size and a shape slightly larger than those of the head 32 of the bush 10, so as to allow such head to abut on the step 39 with smaller diameter, after the passage of the same bush through the front mouthpiece of the through hole 38 of the cap 11, and insertion of the shank 31 of said bush through the back mouthpiece of the through hole 38. Thus, it appears evident the facility of reciprocal assembling of the various component parts of the present shock dampener bumper, with particular reference to the FIG. 1, in which it is noted that all the component parts are assembled removably to each other by adapting by insertion, in the above described manners, the shaped back surface of the intermediate disc 9 made of elastic material with the shaped front surface of the disc 8, then the shaped back surface of the cap 11 against the shaped front surface of the intermediate disc 9, and by inserting the bush 10 through the through holes 38 and 26 coinciding to each other respectively of said cap and said intermediate disc, until the shank 31 and the head 32 of the bush 10 come into abutment respectively with the collar 15 of the disc 8 and the step 39 of the cap 11.

Afterwards, through all the through holes coinciding to each other of the discs, the cap and the bush, it is introduced frontally the fixing stud 20, the threaded shank 21 of which is screwed tigthtly on the threaded hole 22 of the motor-vehicle, until the front head 41 of the stud abuts on the remaining step 40 with larger diameter of the cap 11 and is tighten thereon, thereby determining on the one hand a safe assembling of all the bumper component parts and on the other hand the support of the same bumper on the motor-vehicle constructive structure.

The bumper component parts may also be secured and stiffened to each other with additional fixing means, so as to prevent the same parts to be extracted incidentally therefrom, and the FIG. 1 shows by way of example an additional fixing means which is constituted by a set of threaded bolts 42, the threaded shanks 43 of which are introduced through corresponding axial holes 44 provided through the cap 11 and the discs 9 and 8, and are screwed on into corresponding threaded nuts 45 included in the disc 8. Thus, this bumper allows to dampen effectively the shocks caused by the fall of the motor-vehicle on the ground, therefore protecting the constructive structure of the same motor-vehicle, thanks to the presence of the disc 9 made of elastic material interposed between the outer cap 11, which comes into contact with the ground, and the inner disc 8 into contact with the motor-vehicle, in that such elastic material of the intermediate disc 9 deforms itself during the shock and absorbs almost all the impact energy, thereby preventing or strongly reducing the transmission of the shocks and the related vibrations from the outside towards the motor-vehicle constructive structure, even when such shocks and vibrations exceed determinate safety limits.

The invention claimed is:

1. A shock dampener bumper for motor-vehicles, adapted to be applied on motor-vehicles of various kind, both for personal uses and for sports contests, in order to protect the constructive structure of the motor-vehicle from possible damage and/or breakage thereof in the case in which the motor-vehicle falls, comprising first and second component parts combined and assembled to each other with adequate arrangements, of which said first component parts are made of semi-rigid materials selected from the group consisting of magnesium, plastic, aluminium and other metallic and/or plastic materials having similar characteristics, which are adapted to be secured to and supported by the motor-vehicle constructive structure and to come into contact with the ground when the motor-vehicle falls, said first component parts including a first shaped disc (8), turned towards the motor-vehicle constructive structure for being secured to and supported by the same by fixing means (20), a support bush (10) and a covering cap (11), turned outwards and adapted to come into contact with the ground during the fall, said first disc (8) being shaped with a flat back surface (12) turned towards the motor-vehicle and joined to a short central hub (13), also turned towards the motor-vehicle and projected towards the motor vehicle beyond said back surface (12), said first disc (8) also shaped with a flat front surface (14) turned in an opposite direction, which is joined at one end portion thereof to a central collar (15) slightly projected outwards, and at the other end portion thereof to a flat inclined circular shaped peripheral edge (17), said first disc (8) being further provided with an axial and central through hole (19) provided through said hub (13) and said collar (15), for the insertion and the fixing of said fixing means (20), and said second component parts being made of an elastomeric material and being interposed between said first component parts, in order to dampen and absorb the energy of the shocks and related vibrations, which are produced during the fall, said second component parts including a second shaped disc (9), adaptable between said first disc (8) and said covering cap (11) and couplable with the same by means of said bush (10) and said fixing means (20), wherein said second disc (9) is shaped with a projected back surface (24) having an outline adaptable by insertion with the flat front surface (14) of said first disc (8), and joined with its outer end portion with a flat inclined circular shaped peripheral edge (25) and with its inner end portion with an axial and central through hole (26), provided in a position coinciding to that of the central through hole (19) of said first disc (8), said second disc (9) being also shaped with a flat front surface (27) turned in an opposite direction, which is joined at its one end portion with a flat and cylindrical central collar (28), which is depressed with respect to said front surface (27) and delimits said central through hole (26), and at its other end portion is joined to said flat inclined peripheral edge (25).

2. The shock dampener bumper according to claim 1, wherein said bush (10) is shaped with a cylindrical rear shank (31) and a cylindrical front head (32) joined to said shank (31) and having a diameter larger than said shank (31), said shank (31) and head (32) being crossed by an axial and central through hole (33), provided in a position coinciding to that of said central through holes (19, 26) of the respective first and second discs (8, 9).

3. The shock dampener bumper according to claim 2, wherein said cap (11) is shaped with a flat and hollowed back surface (34), having an outline adaptable by insertion with the flat front surface (27) of said second disc (9), and a front surface (35) turned outwards, shaped with a flat edge (36) joined to the frusto-conical peripheral surface (37) of the cap, said cap (11) being also crossed by an axial and central through hole (38), provided in a position coinciding to that of said central through holes (19, 26, 33) respectively of said discs (8, 9) and said bush (10), and realized with two different diameters which are joined to each other with two flat circular steps (39, 40), said bush (10) being inserted with its shank (31) through said through holes (38, 26) respectively of said cap (11) and said second disc (9), until such shank abuts on the projected collar (15) of said first disc (8) and the head (32) of the same bush abuts on the step (39) having smaller diameter, and said fixing means (20) in the form of a stud is inserted through the through holes (38, 33, 26, 19) respectively of said cap (11), said bush (10) and said first and second discs (8, 9), until said stud threaded shank (21) is screwed into a threaded hole (22) of the motor-vehicle and a front head (41) of said stud abuts on the step (40) having larger diameter of said cap (11) and is tightened thereon, and the so assembled component parts may be fixed and stiffened to each other with a plurality of threaded bolts (42), inserted through corresponding axial holes (44) provided through said cap (11) and said first and second discs (8, 9) and threaded nuts (45) included in said first disc (8).

\* \* \* \* \*